United States Patent [19]

Takenaka

[11] Patent Number: 5,025,672
[45] Date of Patent: Jun. 25, 1991

[54] STEPLESS TRANSMISSION

[75] Inventor: Norimasa Takenaka, Takatsuki, Japan

[73] Assignee: Tsubakimoto Chain Co., Japan

[21] Appl. No.: 403,389

[22] Filed: Sep. 6, 1989

[30] Foreign Application Priority Data

Sep. 14, 1988 [JP] Japan ............................ 63-122004[U]

[51] Int. Cl.[5] ............................................. F16H 15/08
[52] U.S. Cl. ......................................... 74/208; 74/199
[58] Field of Search .................... 74/199, 208, 200; 219/121.6, 121.67, 121.72

[56] References Cited

U.S. PATENT DOCUMENTS

| 3,181,381 | 5/1965 | Jorgensen | 74/199 |
| 3,765,257 | 10/1973 | Ogino | 74/199 |
| 4,557,155 | 12/1985 | Kopatz | 74/199 |
| 4,782,208 | 11/1988 | Withrow et al. | 219/121.67 |

FOREIGN PATENT DOCUMENTS

| 1625128 | 6/1970 | Fed. Rep. of Germany | 74/199 |
| 254543 | 3/1988 | Fed. Rep. of Germany | 219/121.72 |
| 837117 | 2/1939 | France | 74/208 |
| 55-103292 | 8/1980 | Japan | 219/121.72 |
| 57-193289 | 11/1982 | Japan | 219/121.72 |
| 61-17391 | 1/1986 | Japan | 219/121.72 |
| 339453 | 8/1959 | Switzerland | 74/208 |
| 615063 | 12/1948 | United Kingdom | 74/208 |
| 870912 | 6/1961 | United Kingdom | 74/208 |

Primary Examiner—Leslie A. Braun
Assistant Examiner—Scott Anchell
Attorney, Agent, or Firm—Stevens, Davis, Miller & Mosher

[57] ABSTRACT

The invention generally relates to a stepless transmission, and more particularly to an improvement of a cam system equipped to press a friction disc on the output side, wherein the cam system comprises a cam with a cam face which attaches to an output shaft and a sleeve with a driven face which couples with the cam face and is fixed on a friction disc.

One or both of a cam face and a driven face are cut off and formed in smooth curved surfaces such as spiral or wavy surfaces through a laser process. By adopting a laser process, precision of coupling the cam face with the driven face is easily improved, and a friction disc and a rotary disc can be mutually pressed with a minimum compressing pressure in accordance with transmission torque.

A pair of pieces is obtained by cutting a single tubular stock by means of a laser process, one of the so cut pieces is used for a cam and the other for a sleeve.

1 Claim, 5 Drawing Sheets

STEPLESS TRANSMISSION

BACKGROUND OF THE INVENTION

The present invention is related to a stepless transmission using a friction disc which allows cost reduction of the device by simply forming a cam to press a friction disc.

Hitherto there is known a stepless transmission having a speed changing system which uses a pair of discs and shifts by changing the contacting position of both the discs.

Such a transmission, as schematically shown in FIG. 6, is equipped with a friction disc a on the output side facing toward a rotary disc b which rotates while having a slight inclination against the center line of rotation of the friction disc to input side, wherein torque is transmitted from input side to output side by pressing to connect the friction disc a with the rotary disc b, and by moving the rotary disc b while keeping it pressed and connected with the friction disc, the pressure-connecting position is dislocated, resulting in speed change.

Thus, the friction disc a rotates having the same center with an output shaft and being kept pressed against the rotary disc b while.

Furthermore, in order to press the friction disc a, a cam d which moves along the shaft center of the output shaft c and a spring e which thrusts the friction disc a toward the rotary disc b are employed.

As the cam d is to generate a contacting pressure between the friction disc a and the rotary disc b in proportion to transmission torque, the cam face should be formed with relatively high precision.

However, in order to precisely couple the cam face positioned on output shaft c side and the driven face positioned in friction disc a side, both the cam face and the driven face have had curved surfaces such as spiral surfaces, and the curved surfaces have been formed by a machining process using, for example, a milling machine. Such a machining process needs time and high production cost which results in increased cost of the device.

The present inventor, as a result of studying hard to solve these problems, has found that a laser beam can be adapted to form a cam face, and that by employing a cam formed by laser beam in a stepless transmission, the device works smoothly with the cam.

The object of the present invention is to provide a stepless transmission that improves precision of the coupling and reduces cost, basically by forming a cam face of a driven face cut off by a laser process which couples with a cam face.

In order to solve the problems, the stepless transmission of this invention comprises:

an output shaft equipped with a cam which contains an outward output shaft part and an inward cam face;

a tabular sleeve with a driven face into which the output shaft is inserted so as to be movable along the center line of rotation of the output shaft by a relative rotation of the driven face and the cam face;

a friction disc which is fixed on the sleeve; and a rotary disc which is pressed to contact the friction disc and moves relatively to the friction disc; wherein the cam face or the driven face is formed by cutting off by means of laser process.

Moreover, in the stepless transmission of this invention, the cam and the sleeve are cut off and formed by means of laser process from a tubular form, and the cut section of the cam side forms the cam face and the cut section of the sleeve side forms the driven face.

As the cam face or the driven face is cut off and formed by a laser process, even in the case where the cam face or the driven face is formed in complex curved surfaces such as spiral surfaces, it can be formed precisely and easily.

Thus, the sleeve can be pressed against the rotary disc in proportion to transmission torque, and as for the contacting pressure between the friction disc and the rotary disc, it is enough for the stepless transmission to give nearly a minimum necessary pressure that matches with the output torque, which helps to improve durability of the device. In addition, even when the friction disc is worn and reduced in thickness, the sleeve moves inward, thereby transmitting torque without any problem. Moreover, by adopting a laser process, necessary time for processing the cam face or driven face can be dramatically shortened as compared with the conventional machine cutting process, which leads to reduced cost of the devices.

DETAILED DESCRIPTION OF THE INVENTION

Figure 1:
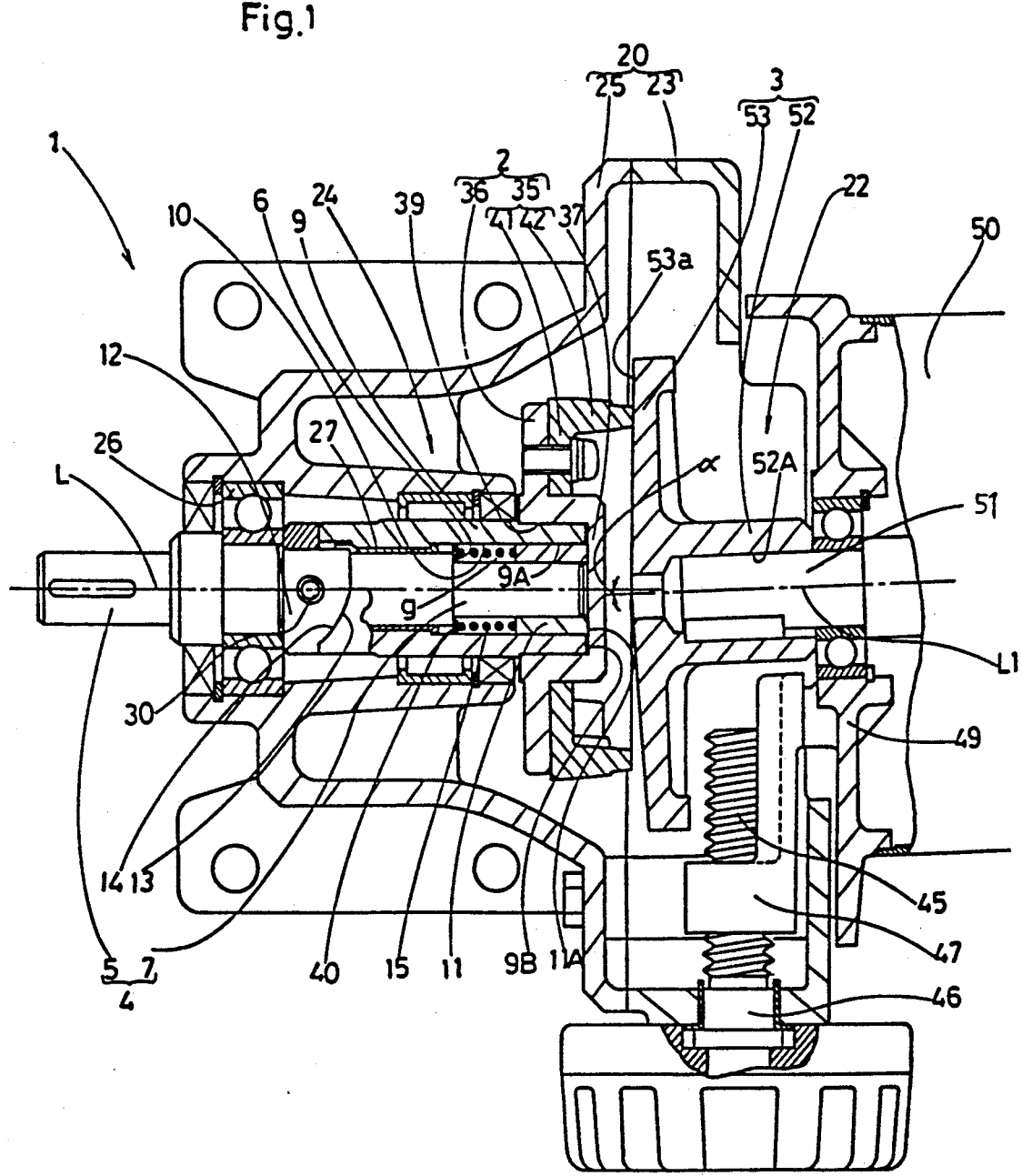
FIG. 1 shows a sectional view of one of the embodiments of the invention.

Referring now to the drawings, one of the embodiments of the invention is described in details below.

Figure 2:
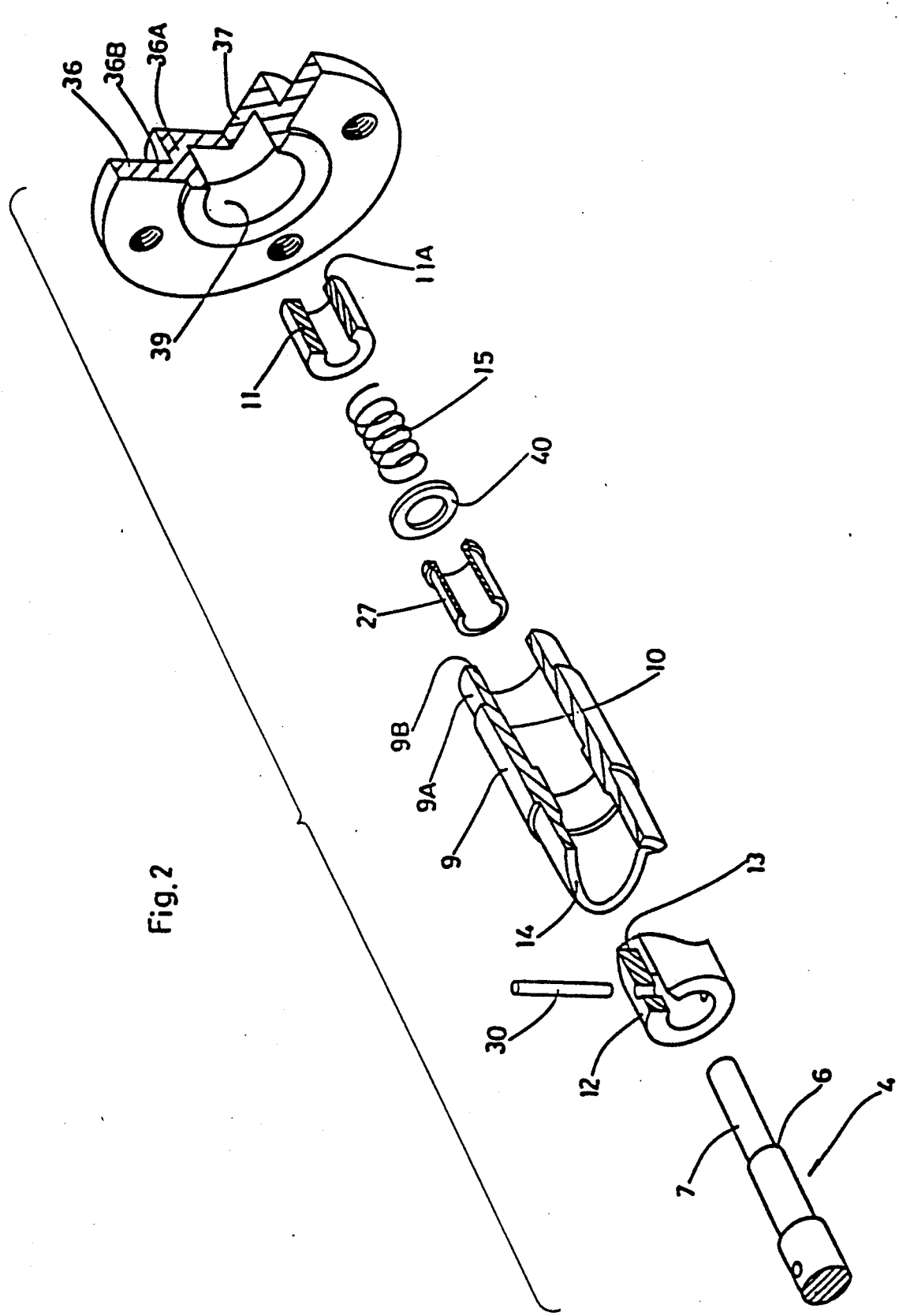
FIG. 2 shows a perspective exploded view of essential parts of the embodiment.

In FIGS. 1 and 2, the stepless transmission 1 of the invention is equipped with a friction disc 2 and a rotary disc 3 which freely moves relatively to the friction disc 2 and is pressed to contact with the friction disc 2, wherein the friction disc 2 and the rotary disc 3 are housed in a case 20 in this embodiment.

The case 20 is made by combining and connecting a framework 23 on the input side which supports an input part 22 including the rotary disc 3 and a framework 25 on the output side which supports, with a shaft, an output part 24 equipped with the friction disc 2.

An output shaft 4 comprises an output shaft part 5 which rotates freely and is supported by a bearing 26 mounted outside of the said framework 25 on the outer end and an inward part 7 which inwardly connects the output shaft part 5 and has an inward step 6.

The inward part 7 is inserted into a sleeve 9. The sleeve 9 has a tubular shape having a bore 10, and a bearing piece 11 is fixed at the end inside the bore 10, which supports the inward part 7 of the output shaft 4.

In the bore 10, a bearing part 27 which can support outside the step 6 of the inward part 7 of the output shaft 4 is mounted at a spacing from the bearing piece 11. The bearing piece 11 and the bearing part 27 are composed of an oil-filled bearing or a synthetic resin bearing, or a needle bearing having a rolling face on its inner circumference.

The outward side of the inward part 7 is inserted into a cam 12. The cam 12 has a tubular shape having an outer diameter similar to the sleeve 9, and can be fixed on the inward part 7 with a pin 30 which is put through a vertical pin hole crossing the shaft center of the cam 12 nearly orthogonally and penetrating the inward part 7.

In the cam 12, a cam face 13 is formed on its inward end surface which comprises a continuous curved surface and a driven face 14 is formed on the outward end surface of the sleeve 9 which continuously abuts against the cam face 13.

The cam face 13 and the driven face 14, by forming both in a shape including a periodic repetition of a part of a curved spiral surface, for example, can be connected tightly, and the sleeve 9 can be moved toward the center line of rotation L of the output shaft 4 through the relative rotation between them.

The cam 12 and the sleeve 9 are formed by cutting off a base tube 16 comprising a tube by means of a laser process.

Figure 3:
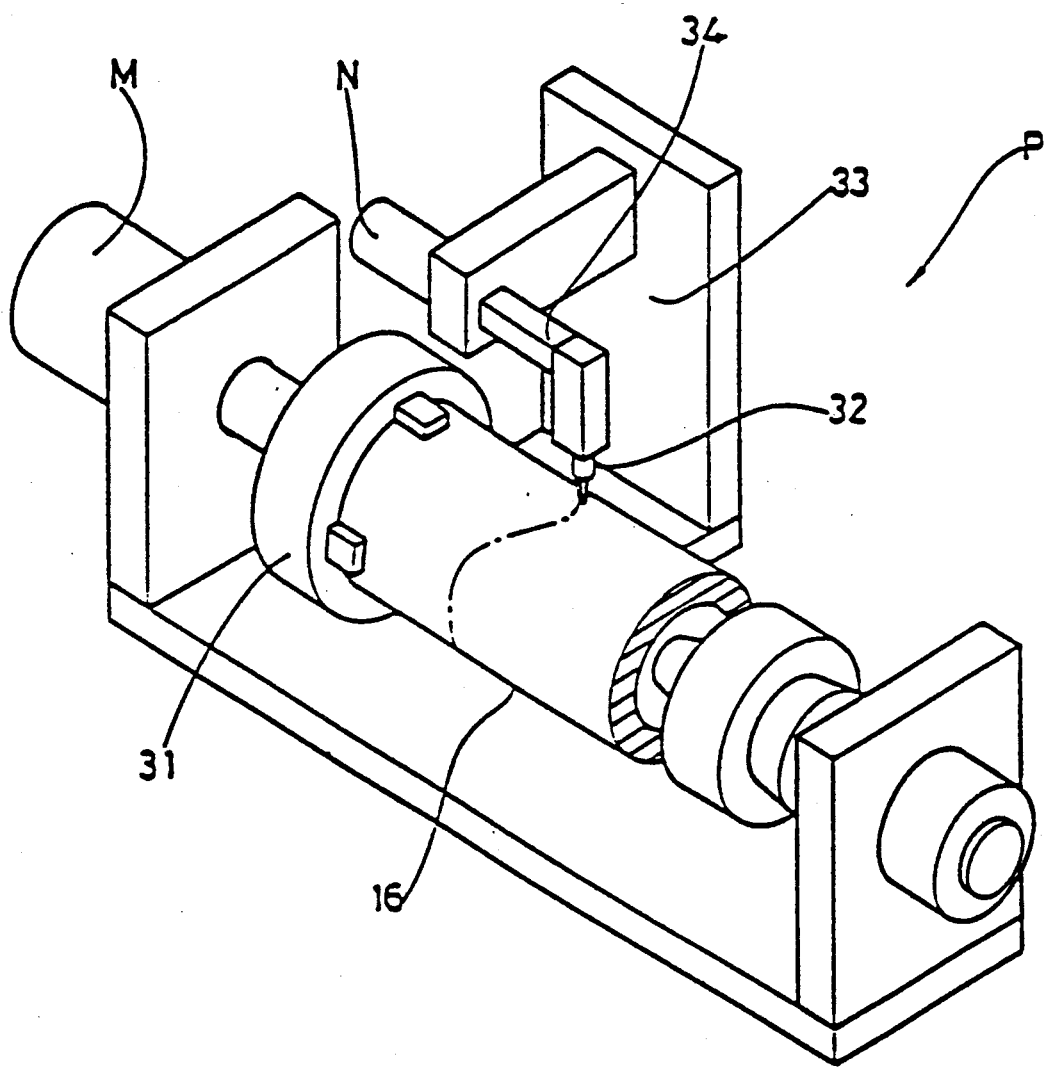
FIG. 3 shows an example of a processor to process a cam face or a driven face.

The processor P, for example, as shown in FIG. 3, holds the base tube 16 at its end with a chuck 31 attaching to the output shaft of a reducing motor M and positions a laser beam generator 32 above the base tube 16. A laser beam generator 32 is attached to a support element 33 standing on the base plate and to a mobile end 34 of a linear mover N which moves back and forth along the shaft center of the base tube 16.

The processor P operates the reducing motor M and the linear mover N synchronizing them according to a specified standard and cuts off the base tube 16 by laser beam generated by the laser beam generator 32 into two cut pieces with particular curved surfaces, such as spiral surfaces, formed on the cut sections, one of which is used for the cam 12 and the other for the sleeve 9.

By cutting off the base tube 16 with such a processor P, a cam 12 having a cam face 13 and a sleeve 9 having a driven face 14 can be formed simultaneously without generating excessive cut chips as in the case of forming through a cutting process, thus saving material. It is preferable to finish the roughness of each surface of the cam face and the driven face at or less than 25 S, and a finishing process may be employed if the cut sections are too rough. The inner and outer circumferences of the cam face and the driven face can be finished in a particular size by a machining process after separating them through the said laser process.

Though, after cutting off the cam and the sleeve by a laser beam, grinding and hardening processes for the inner circumference and finish grinding for appropriate parts, such as inner and outer circumferences of the sleeve are usually employed, the cut sections can be slightly hardened by laser-cutting them in an atmosphere of high-temperature oxygen gas.

The processor P can simultaneously form two cams 12 and 12, or two sleeves 9 and 9 from one base tube 16, thus forming the cams 12 and 12 for two devices, or the sleeves 9 and 9 for two devices at one time through a single cutting process.

Thus, in the stepless transmission of the invention, one or both of the cam face 13 and the driven face 14 can be formed through cutting by a laser process.

The friction disc 2 comprises a disc base 35 frictionally contacting with the rotary disc 3 and a hub 36 to attach the disc base 35.

The hub 36 comprises a disc flange 36B, extending from a boss part 36A covering the inward end 9A of the sleeve 9, to which the friction disc 2 attaches, and in the boss part 36A, and inner bore 39 opens outward which is closed with a side wall 37 at the inner end, i.e. at the end facing the rotary disc 3.

In the bore 10 of the sleeve 9, the bearing part 27 with its step 6 in the outward position is attached, and the inward part 7 of the output shaft 4 is inserted into the bore 10 supporting the inward part 7 with the bearing part 27 and the bearing piece 11, thus positioning the sleeve 9 and the inward part 7 approximately concentrically and at a spacing g.

In the spacing g, a spring 15 is inserted, wherein the outward end surface of the spring 15 abuts against the step 6 through a collar 40 and the inward end surface of the spring 15 abuts against the outward side surface of the bore part 10. The bearing piece 11 is pressed and inserted to position its inward end surface 11A at nearly the same point with the outward end surface 9B of the sleeve 9 or at slightly outward point, and the spring 15 is adjusted to have a particular thrusting pressure generated by compression at the position.

Thus, by pressing and inserting the bearing piece 11, the spring 15 is positioned between the bearing piece 11 and the step 6 of the inward part 7, to have a thrusting force to elastically separate the output shaft 4 from the sleeve 9.

When the free length of the spring 15 is set within a such range that it can be completely contained in the bore 10, the bearing piece 11 is guided by the bore 10 and the inward part 7 upon starting pressure-insertion at both the circumferences and the bore surface, allowing further easier insertion.

The inward end part 9A of the sleeve 9 is inserted into the inner bore 39 of the hub 36, and the sleeve 9 and the hub 36 are firmly fixed by pressure-insertion or key-fixing. Moreover, the fixation prevents the side wall 37 from moving into the bearing piece 11.

The disc base 35 comprises a disc base part 41 attached and fixed with a bolt to the side surface on input side of the flange 36B of the hub 36 and a raised ring part 42 rising toward the rotary disc 3 from the disc base part 41 and abutting against the rotary disc 3 at its leading end.

Thus, the friction disc 2, fixed to the sleeve 9 to make one body, can rotate around the center line of rotation L together with the output shaft 4, and the leading end of the raised part 42 is pressure-fitted to the rotary disc 3 by an action force toward the shaft which is generated from the relative movement of the cam face 13 and the driven face 14 through the thrusting pressure of the spring 15 and the rotation.

The input part 22 supported by the framework 23 on the input side has a nut piece 47 which is screwed into a threaded part 45 of a support shaft 46 containing the threaded part 45 at its bottom end, and supports through a bearing an output shaft 51 of a motor 50 which fixes the rotary disc 3 on an attachment piece 49 which moves up and down in the drawing shown in FIG. 1. The main body of the motor 50 is fixed on the attachment piece 49.

The rotary disc 3 comprises a boss part 52 containing a hole 52A with a center line of input rotation L1 inclined by a small angle * against the center line of rotation L on the output side, and a driving plate 53 which attaches to the output side of the boss part 52. The output shaft 51 is supported by the attachment piece 49 at an equal inclination to that of the hole 52A of the boss part 52.

In the driving plate 53, the output side face 53a is formed in a cone shape rising in the middle at an equal inclination to the small angle * of the shaft hole of the boss part 52, thus allowing the face 53a to form a driving face which moves up and down in FIG. 1 and approximately orthogonally to the center line of rotation L and pressure-fits the raised part 42 of the friction disc 2.

Hence, along with the rotation of the output shaft 51 of the motor, the rotary disc 3 rotates transmitting the rotation to the friction disc 2 which pressure-fits the rotary disc 3.

By rotating the support shaft 46, the input part 22 moves up and down, dislocating the pressure-connecting part with the raised part 42 toward the radial direction of the rotary disc 3 by a particular rotating speed of the output shaft of the motor, increases or decreases the rotating speed of the friction disc 2, which results in change of speed.

The spring 15 is positioned between the step 6 of the output shaft 4 and the bearing piece 11 fixed on the sleeve 9, which allows easy mounting of the spring 15 and a precise setting of the mounting length, resulting in maintaining a precise compressing pressure between the friction disc 2 and the rotary disc 3.

The cam face 13 and the driven face 14 relatively rotates in accordance with the variation of torque of the load in connection with the output shaft 4, and by this relative rotation the coupling point of the cam face 13 and the driven face 14 is dislocated, which forwards or reverses the sleeve 9 to or from the rotary disc 3. In other words, when the torque of load becomes greater, the rotary disc 3 moves inward and the friction disc 2 compresses the rotary disc 3 with greater pressure, thus the friction disc 2 and the rotary disc 3 are pressed with a strong compressing force, resulting in greater torque transmission available between them.

When the torque of the load becomes smaller, the sleeve 9 moves outward and the compressing force between the friction disc 2 and the rotary disc 3 decreases. Thus, the transmission of torque to the output shaft 4 through the cam face 13 and the driven face 14 keeps the compressing force at almost the minimum level, which enables one to improve durability of the device.

The cam face 13 or the driven face 14 is formed easily and quickly through formation by a laser process.

Figure 4:
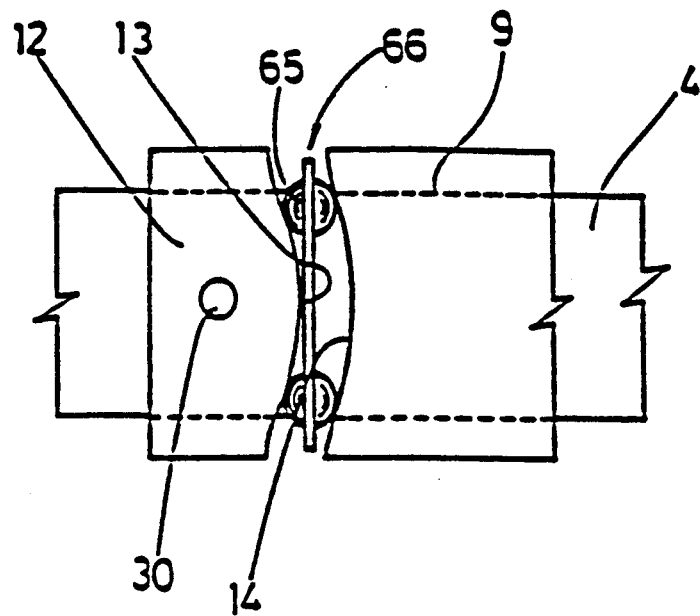
FIG. 4 shows a front view of another embodiment.

In the device of this invention, as shown in FIG. 4, by employing a ball retainer 66 containing a plurality of balls 65 between the sleeve 9 and the cam 12, the cam face 13 and the driven face 14 can be formed to operate through the balls 65.

Figure 5:
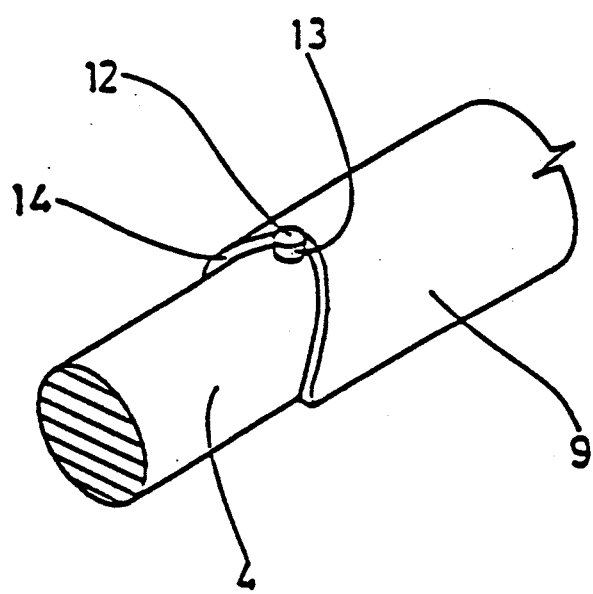
FIG. 5 shows a perspective view of still an other embodiment.
Figure 6:
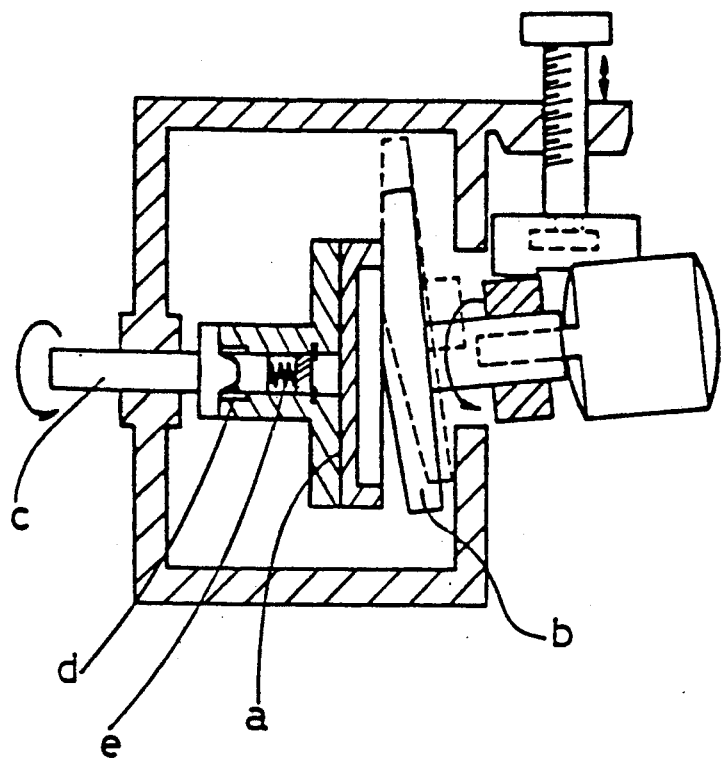
FIG. 6 is a schematic sectional view showing the prior art.

FIG. 5 shows another embodiment of the invention, with the cam 12, wherein the cam face 13 is formed in pin-shape having a circumference and the driven face 14 of the sleeve 9 coupling with the cam face 13 is formed by a laser process.

Thus, the invention may be embodied into a variety of shapes.

As described herein above, in the stepless transmission of the invention, as the cam face or the driven face is cut off and formed through laser process, even when the cam face or the driven face has a complex curved surface, it can be formed easily and quickly while keeping high precision. Moreover, unlike the conventional cutting process, it does not produce massive cut chips, saving material and simplifying the process, thereby resulting in reduced cost of the device.

What is claimed is:

1. A stepless transmission comprising:
    an output shaft rotatably supported by a case;
    a cam having a tubular shape, mounted on the output shaft between the ends of the output shaft so as to partition the output shaft into an output shaft outward part and an inward part, said cam having an inward end facing in the same direction as the inward part of said output shaft and said cam having a continuous curved surface on the inward end of the cam;
    a sleeve having a tubular shape with a driven face engaging with the inward end of the cam said sleeve being inserted on the inward part of the output shaft so as to be axially movable along the center line of rotation of the output shaft by relative rotation of the driven face and the cam inward end;
    a friction disc which is fixed on the tubular sleeve; and
    a rotary disc which is pressed to contact the friction disc and mounted for movement relative to the friction disc, wherein
    the tubular sleeve has the same diameter as the diameter of the cam,
    the driven face and the engaging inward end of the cam being complementarily curved along the cam face,
    the cam and tubular sleeve being formed by division of one cylindrical body into two pieces by means of a laser process, and
    each of the inward end and the driven face being formed by a cut section surface of each of the divided pieces.

* * * * *